United States Patent
Kuhneweg

(12) 
(10) Patent No.: US 7,129,286 B2
(45) Date of Patent: Oct. 31, 2006

(54) WATERBORNE ACRYLIC MODIFIED ALKYD RESINS

(75) Inventor: Bernd Kuhneweg, Dusseldorf (DE)

(73) Assignee: Hexion Specialty Chemicals, Inc., Columbus, OH (US)

( * ) Notice: Subject to any disclaimer, the term of this patent is extended or adjusted under 35 U.S.C. 154(b) by 239 days.

(21) Appl. No.: 10/416,745

(22) PCT Filed: Nov. 12, 2001

(86) PCT No.: PCT/EP01/13070

§ 371 (c)(1),
(2), (4) Date: May 13, 2003

(87) PCT Pub. No.: WO02/40560

PCT Pub. Date: May 23, 2002

(65) Prior Publication Data

US 2004/0054074 A1    Mar. 18, 2004

(30) Foreign Application Priority Data

Nov. 15, 2000    (EP) .................................. 00124300

(51) Int. Cl.
*C08G 63/688*    (2006.01)
*C08F 299/04*    (2006.01)
*C08L 67/02*    (2006.01)

(52) U.S. Cl. ...................... 523/523; 523/501; 524/603; 525/165

(58) Field of Classification Search ................ 523/523, 523/501; 524/603; 525/165
See application file for complete search history.

(56) References Cited

U.S. PATENT DOCUMENTS

| | | | |
|---|---|---|---|
| 2,760,886 A | * | 8/1956 | Prentiss et al. ............. 428/461 |
| 4,504,609 A | | 3/1985 | Kuwajima et al. |
| 5,349,026 A | | 9/1994 | Emmons et al. |
| 5,371,148 A | | 12/1994 | Taylor et al. |
| 5,378,757 A | | 1/1995 | Blount, Jr. et al. |
| 5,530,059 A | | 6/1996 | Blount, Jr. et al. |

FOREIGN PATENT DOCUMENTS

| | | | |
|---|---|---|---|
| JP | 60221469 A | * | 11/1985 |
| WO | WO 95/02019 A2 | | 1/1995 |
| WO | WO 95/02019 A3 | | 1/1995 |
| WO | WO 95/05413 A1 | | 2/1995 |
| WO | WO 99/07755 A2 | | 2/1999 |
| WO | WO 99/07755 A3 | | 2/1999 |
| WO | WO 99/07759 A1 | | 2/1999 |
| WO | WO 00/73392 A2 | | 12/2000 |

* cited by examiner

*Primary Examiner*—Tae H. Yoon

(57) ABSTRACT

A process for preparing an acrylic-modified alkyd resin comprising the steps of:
  d) preparing a sulfonated alkyd resin product;
  e) preparing an acrylated fatty acid product; and
  f) reacting the product of step a) and the product of step b) under appropriate polymerization conditions,
and for preparing a waterbome composition on the basis thereof as well as products obtainable by those processes.

14 Claims, No Drawings

WATERBORNE ACRYLIC MODIFIED ALKYD RESINS

This is a submission to enter the National Stage under 35 U.S.C. §371 and has provisional rights under 35 U.S.C. §154(d) and claims benefit to International Application No. PCT/EP01/13070 filed 12 Nov. 2001, published in English under PCT Article 21(2) on 23 May 2002, and which claims priority to European Patent Application No. EP 00124300.5 filed 15 Nov. 2000, the entire discloses of each are incorporated herein by reference. The invention is related to a process for preparing an acrylic-modified alkyd resin as well as to products obtainable thereby.

In recent years, considerable effort has been expended by the coatings industry to develop low or zero VOC (volatile organic compounds) containing coating formulations. Regulations to limit the amount of VOC of industrial coatings have encouraged research and development to explore new technologies directed to reducing solvent emissions from industrial solvent-based coatings operations such as automotive, appliance, general metal, furniture, and the like. One technology involves the replacement of organic solvents with water and is of particular interest for the obvious reasons of availability, costs and environmental acceptability. However, while the move from organic solvent-based compositions to aqueous compositions brings health and safety benefits, aqueous coating compositions must meet or exceed the performance standards expected from solvent-based compositions. The need to meet or exceed such performance standards places a premium on the characteristics and properties of waterborne polymer products used in aqueous coating compositions.

Waterborne polymer products have been prepared from each of the three primary industrial film forming polymer types: polyesters, acrylics and alkyds. Of the three polymer types, waterborne alkyd resins exhibit significantly higher coating stability than the waterborne polyester or acrylic resins. In addition, alkyd resins, due to their low molecular weight, exhibit exceptional film forming stability which translates into very high gloss in the final coating film. However, alkyd polymers have relatively slow "dry" and/or cure times, particularly at ambient temperatures. In an attempt to address such concerns, modified alkyds have received considerable attention.

European Patent Application EP 0 267 562 A2 describes emulsions of alkyd resins in which neutralization of the carboxyl groups of methacrylic acid, which have been grafted onto the fatty acid, takes place with amines in order to help stabilize the emulsion. Although use of extra emulsifiers was avoided, these emulsions still contain undesired amines and organic solvents.

U.S. Pat. No. 5,378,757 describes a procedure of preparing a water-dissipatable alkyd resin containing a sulfonate group by reacting at least one monoglyceride, a polycarboxylic acid, and a polyol sulfur monomer adduct containing at least one sulfonate group.

PCT Application WO 95/02019 describes an emulsion of an air-drying resin dispersed in water as well as the preparation of such emulsions. Hybrid emulsions of an alkyd resin and anr acrylate resin are also described.

PCT Application WO 95/05413 describes a method of preparing water-dispersible acrylic-modified polyesters containing sulfonate groups prepared by addition copolymerisation of ethylenically unsaturated vinyl monomers and polyester.

PCT Application WO 99/07759 describes waterborne acrylic-modified sulfonated alkyd resin dispersions prepared by the polymerisation of at least one ethylenically unsaturated monomer in the presence of a waterborne alkyd having at least one pendant sulfonate functionality. The preferred preparation of the dispersions is by emulsion polymerisation.

One object of the present invention is to provide for an improved method of production of acrylic-modified alkyd resins with similar, and preferably superior characteristics known from the prior art.

Thus, the invention provides for a process for preparing an acrylic-modified alkyd resin comprising the steps of:
a) preparing a sulfonated alkyd resin product;
b) preparing an acrylated fatty acid product; and
c) reacting the product of step a) and the product of step b) under appropriate polymerisation conditions.

Preferably, the preparation of the product of step a) comprises the following steps:
i) reacting a polyol and a sulfomonomer to obtain a polyol sulfomonomer adduct, and
ii) reacting a mixture comprising the polyol sulfomonomer adduct of step i), at least one fatty acid, and at least one polycarboxylic acid or anhydride to obtain the sulfonated alkyd resin product.

Most preferably, the polyol used in step i) is trimethylolpropane, and the sulfomonomer of step i) is 5-sodiosulfoisophthalic acid.

In a preferred embodiment of the process, the preparation of the product of step b) comprises reacting at least one fatty acid with at least one acrylic-functional monomer.

Preferably, the preparation of the product of step c) comprises reacting the product of step a) and the product of step b), together with an appropriate catalyst, under condensation polymerisation conditions.

Moreover, the invention is related to a waterborne acrylic-modified alkyd resin, obtainable by the inventive process, and preferably characterized by an acid value of from 10 to 50 mg KOH/g, an oil length of from 5 to 70%, a sulfur monomer content of from 2 to 7%, an acrylic-functional monomer content of from 2 to 45%, and a solids content of from 20 to 60%.

Moreover, the invention is related to a process for preparing a waterborne acrylic-modified alkyd resin composition in water wherein the inventive alkyd resin is dissolved in water andya neutralization agent, as well as to the respective composition obtainable thereby.

Finally, the invention is related to a coating composition comprising the inventive waterborne resin composition and at least one additive selected from the group consisting of leveling, rheology and flow control agents, extenders, reactive coalescing aids, plasticizers, flatting agents, pigment wetting and dispersing agents and surfactants, ultraviolet (UV) absorbers, UV light stabilizers, tinting pigments, colorants, defoaming and antifoaming agents, anti-settling, anti-sag and bodying agents, anti-skinning agents, anti-flooding and anti-floating agents, biocides, fungicides and mildewcides, corrosion inhibitors, thickening agents, and coalescing agents.

The invention provides for the preparation of the novel acrylic-modified alkyd resins by a process, in which two primary products are polymerized and subsequently dissolved in water. Although we do not wish to be bound by any theory, we assume the surprisingly superior water solubility of the inventive resin to be due to a combination of sulfuric acid functionality in the alkyd part and carboxylic acid functionality in the acrylic part of the resin.

In a first step of the inventive process, a sulfonated alkyd resin is prepared, basically as described in the prior art, such as U.S. Pat. No. 5,378,757 and WO 99/07759.

Generally, sulfonated alkyd resins may be prepared by reacting a fatty acid; a polyol; a polycarboxylic acid; and a sulfomonomer.

For the purpose of the present invention, the polyol and the sulfomonomer are reacted in a first step to obtain a primary resin product, whereas, in a second step a mixture comprising the primary resin product, the fatty acid, and the polycarboxylic acid or anhydride are reacted.

The polyol is preferably selected from aliphatic, alicyclic and aryl alkyl polyols. Suitable examples of polyols include, but are not limited to, ethylene glycol, propylene glycol, dietkylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol., 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, glycerine, dimethylolpropionic acid, and the like. The most preferred polyol is trimethylolpropane or neopentylglycol.

The sulfomonomer is either a difunctional or monofunctional monomer containing a $SO_3M$-group attached to an aromatic nucleus wherein M is hydrogen or a metal ion such as, for example, $Na^+$, $Li^+$, $K^+$, $Ca^{2+}$, $Cu^{2+}$, $Fe^{2+}$, or $Fe^{3+}$. Suitable examples of the aromatic nucleus to which the $—SO_3M$ group may be attached include, but are not limited to, benzene, naphthalene, anthracene, diphenyl, oxydiphenyl, sulfonyl-diphenyl, and methylenediphenyl.

Especially good results are obtained when the difunctional monomer is a sodium salt of a sulfoisophthalic acid, most preferably 5-sodiosulfoisophthalic acid or a derivative such as dimethyl 5-sodiosulfoisophthalate.

Preferably, the reaction of the polyol and sulfomonomer to obtain the polyol sulfomonomer adduct is conducted in water as the reaction medium together with a suitable catalyst such as hypophosphorous acid.

In the second step for preparing the sulfonated alkyd resin, the polyol sulfomonomer adduct, usually after evaporation of the water, is reacted with at least one fatty acid, at least one polycarboxylic acid or anhydride and optionally additional polyol.

The fatty acid may be any suitable fatty acid or mixture of fatty acids.

The polycarboxylic acid or anhydride is preferably selected from the group consisting of isophthalic acid, terephthalic acid, phthalic anhydride, adipic acid, tetrachlorophthalic anhydride, tetrahydrophthalic anhydride, dodecane dioic acid, sebacic acid, acelaic acid, 1,4-cyclohexane dicarboxylic acid, 1,3-cyclohexane dicarboxylic acid, maleic anhydride, fumaric acid, succinic anhydride, trimellitic anhydride, pyromellitic dianhydride, 2,6-naphthalene dicarboxylic acid, and glutarirc acid.

Additionally, one or more monocarboxylic acids may be added in a minor amount.

The polyol is preferably the same polyol as used in the preparation of the polyol sulfomonomer adduct.

Usually, the reaction is conducted in a suitable solvent, such as xylene, and with a suitable polymerisation catalyst, such a FASCAT 4100, a monobutyltin composition, obtainable from ELF ATOCHEM.

The second component of the acrylic-modified alkyd resin of the present invention is an acrylated fatty acid, obtained by reacting at least one fatty acid with at least one acrylic-functional monomer.

Suitable examples of fatty acids include, but are not limited to, tallow acid, soya acid, myristic acid, linseed acid, crotonic acid, versatic acid, coconut acid, tall fatty acid, rosin acid, neodecanoic acid, neopentanoic acid, isostearic acid, 12-hydroxystearic acid, cotton seed acid, and the like.

The acrylic-finctional monomers include, but are not limited to, acrylic acid, methacrylic acid, methylmethacrylate, isobutylmethacrylate and the like. Preferably, a mixture of acrylic-functional monomers are used, optionally with the admixture of further unsaturated monomers such as vinylic-functional monomers as for example styrene.

Usually, the acrylation of the fatty acid is conducted without any solvent, however, in the presence of an appropriate initiator as well as of an appropriate charge transfer agent.

An example for a good initiator for this reaction is di-t-amyl peroxide. However, other initiators, known to be active for this reaction, can be used.

A preferred charge transfer agent is n-dodecyl mercaptane, although other substances may also be appropriate.

In the last step of the preparation of the inventive acrylic-modified alkyd resin, the sulfonated alkyd resin and the acrylated fatty acid are converted to the final product at elevated temperature in the presence of an appropriate catalyst such as hypophosphorous acid.

To obtain the waterbome acrylic-modified alkyd resin composition of the present invention, the product of this condensation polymerisation is usually, without any further purification steps, directly dissolved in a mixture of water and a neutralization agent such as ammonia.

The waterborne acrylic-modified alkyd resin composition of the present invention can be used as the basis of coating compositions with superior characteristics as described in more detail in the examples. The coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148.

Examples of flatting agents include, but are not limited to, synthetic silica, available from the Davison Chemical Division of W. R. Grace & Company under the SYLOID® tradename; polypropylene, available from Hercules Inc. under the HERCOFLAT® tradename; and synthetic silicate, available from J. M. Huber Corporation under the ZEOLEX® tradename.

Examples of dispersing agents and surfactants include, but are not limited to, sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenyl, 2-amino-2-methyl-1-propanol, and the like.

Examples of viscosity, suspension, and flow control agents include, but are not limited to, polyaminoamide phosphate, high molecular weight carboxylic acid salts of polyamine arnides, and alkylene amine salts of an unsturated fatty acid, all available from BYK Chemie U.S.A. under the ANTI TERRA® tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl celulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water soluble carboxylated thickeners such as, for example, UCAR POLYPHOBE® by Union Carbide.

Several proprietary antifoaming agents are commercially available and include, for example, BUBREAK® of Buckman Laboratories Inc., BYK® of BYK Chemie, U.S.A., FOAMASTER® and NOPCO® of Henkel Corp./Coating Chemicals, DREWPLUS® of the Drew Industrial Division of Ashland Chemical Company, TRYSOL® and TROYKYD® of Troy Chemical Corporation, and SAG® of Union Carbide Corporation.

Examples of fungicides, mildewcides, and biocides include, but are not limited to, 4,4-dimethyloxazolidine, 3,4,4,-trimethyloxazolidine, modified barium metaborate, potassium N-hydroxy-methyl-N-methylditiocarbamate, 2-(thiocyano-methylthio)benzothiazole, potassium dimethyl dithiocarbamate, adamantane, N-(trichloromethylthio)phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include among others substituted benzophenone, substituted benzotriazoles, hindered amines, and hindered benzoates, available from American Cyanamid Company under the CYASORB UV® tradename, and diethyl-3-acetyl-4-hydroxy-benzyl-phosphonate, 4-dodecyloxy-2-hydroxy benzophenone, and resorcinol monobenzoate.

Examples of solvents and coalescing agents are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148.

Pigments sutable for use in the coating compositions evisioned by the invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, CI Pigment White 6 (titanium dioxide); CI Pigment Red 101 (red iron oxide); CI Pigment Yellow 42; CI Pigment Blue 15, 15:1, 15:2, 15:3, 15:4 (copper phthalocyanines); CI Pigment Red 49:1, and CI Pigment Red 57:1. Colorants such as phthalocyanine blue, molybdate orange, or carbon black are also suitable for the coating compositions of the invention.

The following example is given to further illustrate the invention. It should, however, be understood that the invention is not to be limited to the specific details described in these examples. Rather the scope of protection is only defined by the accompanying claims.

EXAMPLE

Preparation of a Short Oil Waterborne Acrylic-modified Alkyd Resin Sulfonated alkyd (1)+acrylated fatty acid (2)→+Water/NH$_3$→final product (3)

(1) Preparation of Sulfonated Alkyd Resin Primary Product:

A sulfonated alkyd resin was produced in two steps.

In the first step, a polyol sulfomonomer adduct was produced following the standard procedure.

For this purpose, 44.2 g 5-sodiosulfoisophthalic acid and 61.8 g trimethylolpropane were mixed together with 8.2 g water containing 0.07 g of 50% hypophosphorous acid as a cadalyst. At the end of the reaction, water (and some of the polyol) was evaporated leaving 100 g polyol sulfomonomer adduct.

In the second step, a reactor was charged with 8,5 g polyol sulfomonomer adduct, obtained in the first step, 22,3 g UKD Edonor 5020, a fatty acid mixture, based on sunflower oil having a conjugated fatty acid content of 48–54%, obtainable from Henkel, 34 g phthalic acid anhydride, 6,4 g benzoic acid, 35 g trimethylolpropane, 0,1 g FASCAT 1400 as a catalyst and 4,7 g xylene as a solvent. The reactor was heated for 3 hours up to 190–210° C. and distillate was collected. When AV (Acid Value determined according to DIN 53183) reached about 5 mg KOH/g, the reactor was cooled down to 170° C. and xylene was removed in vacuo.

The final product (100 g) showing in AV of 4.1 mg KOH/g and a viscosity at 20° C. in 50% xylene (determined according to Nouri Lande) of 8 dpas.

(2) Acrylated Fatty Acid Product:

A reactor was charged with 26.3 g tall fatty acid and heated up to 160° C. The mixture of 6.1 g acrylic acid, 7.5 g methacrylic acid, 42.2 g methylmethacrylate, 7.9 g isobutylmethacfylate and 8.8 g styrene as monomers, 1.01 g di-t-amyl peroxide as initiator and 0.23 g n-dodecyl mercaptane as charged transfer agent, were added dropwise over a time period of 6 hours. The solids content of the final product has been determined (according to DIN 57216: 1 g, 1 h, 120° C.) to 97.5%, the AV to 132 mg KOH/g and the viscosity at 20° C. in 40% xylene (determined according to Nouri Lande) as 19 dPas.

(3) Waterborne Acrylic-modified Alkyd Resin 23.6 g of the sulfonated alkyd resin (1), 14.8 g of the acrylated fatty acid (2) and 0.03 g 50% hypophosphorous acid as a catalyst were charged in a reactor and converted to the final product at a temperature of 160–170° C. When the AV reaches 30 to 33 mg KOH/g, the reaction mixture was cooled down to 140° C. and 2.9 g butylglycol as a co-solvent was added. Subsequently, the product was dissolved in 58.1 g water containing 1 g 25% ammonia as a neutralizing agent.

The solids content of the final product was determined to 38,0%, the pH value (determined according to DIN 19263) as 7.3% and the viscosity at 20° C. as 70 dPas.

Evaluation Tests

The tests were conducted with the short oil waterborne acrylic-modified alkyd resin obtained as described hereinabove, and Resydrol AY241, obtainable from Vianova, a commercial short oil waterborne acrlyic-modified alkyd resin without sulfonate functionality.

Water Absorption

Water absorption capacity was tested according to DIN 53495. The water absorption was tested as clear film (40–50 μm) on steel sheet both after 24 hours and 8 days drying in a double test after 24 h in water by determination of the weight gain of the samples. The test results can be seen from following Table 1.

TABLE 1

|  | Water absorption | |
| --- | --- | --- |
|  | Invention | Resydrol AY241 |
| 24 hours drying | 27%/40% | 34%/33% |
| 8 days drying | 30%/36% | — |

From the table, it can be seen that the water absorption is in a similar range. A low wafer absorption is an indication for a good vesirability and mechanical strength as well as good protecting function, in particular on metal.

Mechanical Properties

The mechanical properties were tested for Pendulum Hardness according to the method of Koenig (DIN 53157), for Pencil Hardness according to ECCA and for Degree of Drying (DIN 53150) on a 40–50 μm coating on a glass plate.

The respective values can be seen from following Table 2.

with a watch glass and evaluated after 12 h. The evaluation was on discoloration, tarnishing and blistering. The results were equivalent both for the sample according to the invention and for the sample coated with Resydrol AY241.

However, the coatings made by the alkyd resin of the present invention and by the known alkyd resin show differences in absorbency speed. The coating according to the present invention absorbs sorbs significantly faster than the coating of the known alkyd resin, although the total amount of water absorption is similar in both cases. Despite the faster water absorbency of the two films, there was no staining due to any corrosion process with the inventive product. This characteristic may be useful for specific applications.

Adhesion on Metal

The adhesion on metal was tested with the cross-cut method according to DIN 53151. The film made of the product of the present invention shows significantly better adhesion on metal than a film made of the known alkyd resin used for comparative tests for the water resistance.

Storability

Storability was tested at constantly 40° C. in a climatized box. The product of the present invention was stable after 12 weeks.

The features disclosed in the foregoing description, and/or in the claims may, both separately and in any combination thereof, be material for realizing the invention in diverse forms thereof.

The invention claimed is:

1. A process for preparing an acrylic-modified alkyd resin comprising the steps of:
    a) preparing a sulfonated alkyd resin product;
    b) preparing an acrylated fatty acid product; and
    c) reacting the product of step a) and the product of step b) under appropriate polymerization conditions.

2. The process according to claim 1, wherein the preparation of the product of step a) comprises the following steps:
    i) reacting a polyol and a sulfomonomer to obtain a polyol sulfomonomer adduct, and ii) reacting a mixture comprising the polyol sulfomonomer adduct of step i), at least one fatty acid, and at least one polycarboxylic acid or anhydride to obtain the sulfonated alkyd resin product.

TABLE 2

|  | Pendulum Hardness | | | | | Pencil Hardness | | | | Degree of Drying | | | | | |
| --- | --- | --- | --- | --- | --- | --- | --- | --- | --- | --- | --- | --- | --- | --- | --- |
|  | 24 h | 48 h | 144 h | 192 h | 216 h | 24 h | 48 h | 192 h | 216 h | 1 h | 24 h | 48 h | 144 h | 19 h | 216 h |
| Invention | 30 | 35 | 49 | — | 65 | 5 B | 5 B | — | 3 B | TG4 | TG4 | TG4 | TG4+ | — | TG4++ |
| Resydrol AY241 | 23 | 35 | — | 51 | — | 6 B | 6 B | 4–5 B | — | — | TG4 | TG4 | — | TG5 | — |

The mechanical properties of the inventive resin are at least comparable, if not superior, to those of the commercial resin product.

Water Resistance for testing the water resistance a film with a thickness of $1.75 \times 10^{-4}$ m is coated onto a steel sheet and dried thereon at room temperature for 24 h. A drop of water with a diameter of ca. 3 cm was loaded onto the coating, covered 3. The process according to claim 2, wherein the polyol used in step i) is trimethylolpropane, and the sulfomonomer of step i) is 5-sodiosulfoisophthalic acid.

4. The process according to any of the preceding claims, wherein the preparation of the product of step b) comprises reacting at least one fatty acid with at least one acrylic-functional monomer.

5. The process according to claim 1, wherein the preparation of the product of step c) comprises reacting the product of step a) and the product of step b), together with an appropriate catalyst, under condensation polymerization conditions.

6. An acrylic-modified alkyd resin prepared by the process of claim 1, wherein the acrylic-modified alkyd resin has an acid value of from 10 to 50 mg KOH/g an oil length of from 5 to 70%, a sulfur monomer content of from 2 to 7%, and an acrylic-functional monomer content of from 2 to 45%.

7. An acrylic-modified aalyd resin prepared by the process of claim 2 wherein the acrylic-modified alkyd resin has an acid value of from 10 to 50 mg KOH/g, an oil length of from 5 to 70%, a sulfur monomer content of from 2 to 7%, and an acrylic-functional monomer content of from 2 to 45%.

8. An acrylic-modified alkyd resin prepared by the process of claim 3 wherein the acrylic-modified alkyd resin has an acid value of from 10 to 50 mg KOH/g, an oil length of from 5 to 70%, a sulfur monomer content of from 2 to 7%, and an acrylic-functional monomer content of from 2 to 45%.

9. A process for preparing a waterborne acrylic-modified alkyd resin composition comprising: a) preparing an acrylic-modified alkyd resin prepared by the process of claim 1; and b) dissolving the product of step (a) in a solution of water and ammonia.

10. The process of claim 9 wherein the preparation of the product of step a) comprises the steps of:
  i) reacting a polyol and a sulfomonomer to obtain a polyol sulfomonomer adduct, and
  ii) reacting a mixture comprising the polyol sulfomonomer adduct of step i), at least one fatty acid, and at least one polycarboxylic acid or anhydride to obtain the sulfonated alkyd resin product.

11. The process of claim 10, wherein the polyol used in step i) is trimethylolpropane, and the sulfomonomer of step i) is 5-sodiosulfoisophthalic acid.

12. A coating composition comprising a) a waterborne acrylic-modified alkyd resin composition prepared by the process of claim 9; and b) one additive selected from the group consisting of leveling rheology and flow control agents, extenders, reactive coalescing aids, plasticizers, flatting agents, pigment wetting and dispersing agents and surfactants, ultraviolet (UV) absorbers, UV light stabilizers, tinting pigments, colorants, defoaming and antifoaming agents, anti-settling, anti-sag and bodying agents, anti-skinning agents, anti-flooding and anti-floating agents, biocides, fungicides and mildewcides, corrosion inhibitors, thickening agents, and coalescing agents.

13. The coating composition of claim 12 wherein the preparation of the product step a) comprises the steps of:
  i) reacting a polyol and a sulfomonomer to obtain a polyol sulfomonomer adduct, and
  ii) reacting a mixture comprising the polyol sulfomonomer adduct of step i), at least one fatty acid, and at least one polycarboxylic acid or anhydride to obtain the sulfonated alkyd resin product.

14. The coating composition of claim 13, wherein the polyol used in step i) is trimethylolpropane, and the sulfomonomer of step i) is 5-sodiosulfoisophthalic acid.

* * * * *